(No Model.)
E. W. YOUNG.
CEMENT INJECTOR FOR REPAIRING PNEUMATIC TIRES.
No. 537,099. Patented Apr. 9, 1895.
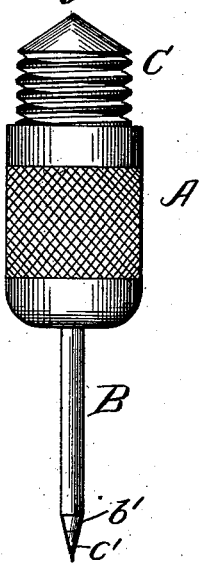
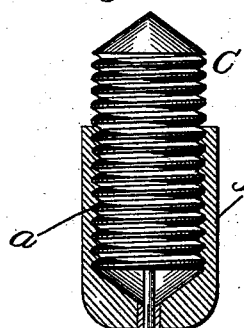
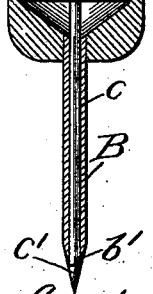
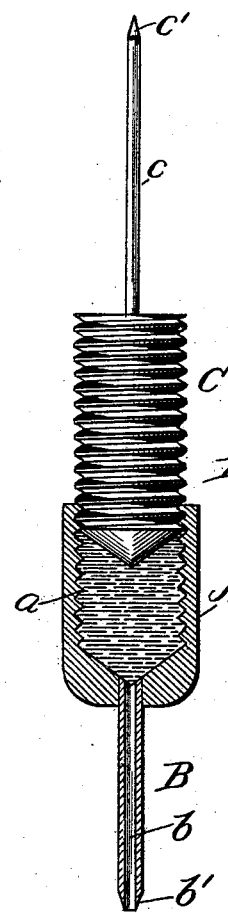
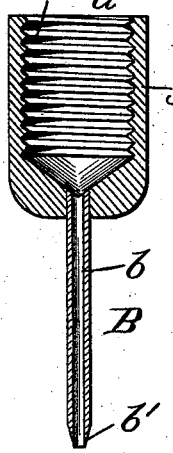
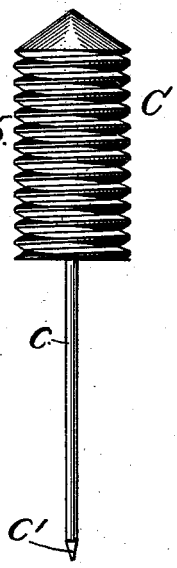

UNITED STATES PATENT OFFICE.

ERNEST W. YOUNG, OF CHICAGO, ILLINOIS.

CEMENT-INJECTOR FOR REPAIRING PNEUMATIC TIRES.

SPECIFICATION forming part of Letters Patent No. 537,099, dated April 9, 1895.

Application filed December 26, 1894. Serial No. 532,926. (No model.)

*To all whom it may concern:*

Be it known that I, ERNEST W. YOUNG, a citizen of the United States, residing at Chicago, in the county of Cook and State of Illinois, have invented a certain new and useful Improvement in Cement-Injectors for Repairing Pneumatic Tires, of which the following is a specification.

In certain cases it is found expedient to introduce cement within a punctured pneumatic tire with the view of closing the puncture. An illustration of the applicability of cement for such purpose is found in Letters Patent of the United States No. 527,097, granted and issued to me October 9, 1894. It is also understood that in repairing other constructions of pneumatic tire cement can be introduced within the punctured tire for purposes of repair.

My invention relates to injectors for introducing a suitable quantity of cement within a punctured pneumatic tire for purposes of repair and has for its object to provide a simple, compact, easy working and generally efficient injector which can be readily introduced within the tire.

In constructing an injector in accordance with my invention, I provide a threaded cup having a tubular discharge nozzle which is sharpened or beveled at its outer end, and in connection therewith I provide a threaded plunger having at one end an axially extending stem or needle which is sharpened at its outer end. The threaded plunger is adapted to screw within the threaded cup and the plunger stem or needle is adapted to fit within the tubular discharge stem or nozzle of the cup, the arrangement being such that when the stem of the plunger is introduced into the nozzle of the cup and the plunger screwed down within the latter, the pointed end of the stem will project from the outer end of the nozzle so as to form a sharpened continuation of the same and thereby permit the nozzle to be introduced through a small puncture in a tire sheath. After thus introducing said nozzle within the tire the plunger can be withdrawn and after placing a suitable quantity of cement in the cup, the plunger can be reversed and again introduced into the said cup from which latter the cement can be ejected by screwing down the plunger.

In the accompanying drawings,—Figure 1 represents in side elevation a cement injector embodying my invention and in condition for introduction within a pneumatic tire. Fig. 2 is a section taken centrally and longitudinally through the cup and nozzle of Fig. 1, the plunger being shown in elevation. Fig. 3 shows the cup in central longitudinal section. Fig. 4 shows the cup in central longitudinal section and represents in elevation the plunger introduced into said cup in a reversed condition for the purpose of ejecting cement. Fig. 5 represents the plunger in elevation. Fig. 6 represents in elevation a slightly different form of plunger.

The cup A is internally threaded as at $a$ and is open at one end as at $a'$. The opposite end of the cup is closed with the exception of a small discharge passage $b$ formed through the nozzle B which projects from said end of the cup. This discharge nozzle has its outer end sharpened or beveled as at $b'$ but owing to the presence of said passage $b$, the beveled end of the said nozzle is necessarily somewhat blunt. The externally threaded plunger C is provided with an axially arranged needle or stem $c$ which projects from one end of the plunger and which has its outer end sharpened as at $c'$. When it is desired to introduce the nozzle B through the sheath of a pneumatic tire, the plunger is first introduced into the cup as in Fig. 2 whereby the plunger is shown screwed down to an extent to cause the sharpened end of its stem to project from the outer beveled end of the nozzle and thereby in effect provide the nozzle with a needle point so that it will readily enter the sheath. After introducing the nozzle within the sheath, the plunger can be removed and after placing a suitable quantity of cement within the cup as indicated in Fig. 4, the operator will reverse the plunger and again introduce it into the cup as shown in said figure. By then screwing down the plunger the cement will be forced out through the nozzle of the cup.

In Fig. 6, the plunger is substantially the same as in the preceding figures the only difference being that it is threaded at its ends and reduced in diameter between its said ends as at $c^2$.

What I claim as my invention is—

1. A cement injector for service in repairing pneumatic tires, comprising a receptacle adapted to contain the cement and provided with a discharge nozzle, a needle adapted for temporary insertion within the nozzle to an extent to cause its sharpened end to project from the end of the nozzle so as to provide the latter with a point, and means for ejecting the cement from the receptacle through the nozzle when the needle is withdrawn therefrom.

2. A cement injector comprising an internally threaded cup having a discharge nozzle, and a screw plunger adapted for service within the cup and having a sharpened stem or needle, substantially as and for the purpose set forth.

3. A cement injector comprising a cup having a discharge nozzle, and a reversible plunger having a sharpened stem or needle, substantially as and for the purpose set forth.

ERNEST W. YOUNG.

Witnesses:
ARTHUR F. DURAND,
RETA M. WAGNER.